US012566494B2

(12) United States Patent
Chernyak et al.

(10) Patent No.: US 12,566,494 B2
(45) Date of Patent: Mar. 3, 2026

(54) VISUAL LINE DETECTION DEVICE AND VISUAL LINE DETECTION PROGRAM

(71) Applicant: FOVE, Inc., Minato-ku (JP)

(72) Inventors: Iakov Chernyak, Minato-ku (JP); Grigory Chernyak, Mnato-ku (JP)

(73) Assignee: FOVE, Inc., Tokyo (JP)

( * ) Notice: Subject to any disclaimer, the term of this patent is extended or adjusted under 35 U.S.C. 154(b) by 322 days.

(21) Appl. No.: 18/248,847

(22) PCT Filed: Oct. 12, 2021

(86) PCT No.: PCT/IB2021/059328
§ 371 (c)(1),
(2) Date: Dec. 20, 2023

(87) PCT Pub. No.: WO2022/079584
PCT Pub. Date: Apr. 21, 2022

(65) Prior Publication Data
US 2024/0192771 A1 Jun. 13, 2024

(30) Foreign Application Priority Data
Oct. 12, 2020 (JP) ................................. 2020-172238

(51) Int. Cl.
G06F 3/01 (2006.01)
G06T 5/50 (2006.01)
(Continued)

(52) U.S. Cl.
CPC .............. G06F 3/013 (2013.01); G06F 3/012 (2013.01); G06T 5/50 (2013.01); G06T 7/13 (2017.01);
(Continued)

(58) Field of Classification Search
None
See application file for complete search history.

(56) References Cited

U.S. PATENT DOCUMENTS

2013/0308099 A1* 11/2013 Stack ................... A61B 5/6803
351/209
2016/0027218 A1 1/2016 Salter et al.
(Continued)

FOREIGN PATENT DOCUMENTS

JP H0764709 A 3/1995
JP 2013252301 A 12/2013
(Continued)

OTHER PUBLICATIONS

Office Action for U.S. Appl. No. 18/248,832, dated Sep. 24, 2025.
(Continued)

*Primary Examiner* — Samira Monshi

(57) ABSTRACT

[Technical Problem] To provide a gaze detection apparatus even when multiple bright spots cannot be observed on the cornea.
Solution to Problem
In this gaze detection device, when the bright spots observed on the cornea of the eye based on light emitted from the plurality of light sources are in a first state, the processor:
(1-1) identifies the position of the center of the cornea based on multiple bright spots,
(1-2) identifies the position of the pupil of the eye based on the image of the imaging device, and
(1-3) identifies the gaze direction based on the center of the cornea and the pupil position.
On the other hand, when the bright spots observed on the cornea of the eye based on the plurality of light sources are in the second state, the processor:
(2-1) identifies the shape of the eye according to the data on the radius of the eye and the center of the eye stored in the memory unit, and
(2-2) identifies the gaze direction from the image of the imaging device and the center position of the eyeball.

19 Claims, 12 Drawing Sheets

(51) Int. Cl.

| | |
|---|---|
| *G06T 7/13* | (2017.01) |
| *G06T 7/50* | (2017.01) |
| *G06T 7/60* | (2017.01) |
| *G06T 7/80* | (2017.01) |
| *G06T 9/00* | (2006.01) |
| *G06V 10/141* | (2022.01) |
| *G06V 10/25* | (2022.01) |
| *G06V 40/18* | (2022.01) |

(52) U.S. Cl.
CPC .................. *G06T 7/50* (2017.01); *G06T 7/60* (2013.01); *G06T 7/80* (2017.01); *G06T 9/00* (2013.01); *G06V 10/141* (2022.01); *G06V 10/25* (2022.01); *G06V 40/193* (2022.01); *G06T 2207/20221* (2013.01)

(56) References Cited

U.S. PATENT DOCUMENTS

| | | | |
|---|---|---|---|
| 2018/0350257 | A1 | 12/2018 | Picard |
| 2019/0076014 | A1 | 3/2019 | Ryan et al. |
| 2019/0129501 | A1 | 5/2019 | Nistico et al. |
| 2019/0324276 | A1 | 10/2019 | Edwin et al. |
| 2019/0339770 | A1 | 11/2019 | Kurlethimar et al. |
| 2020/0257357 | A1 | 8/2020 | Ren et al. |
| 2021/0173474 | A1 | 6/2021 | Sztuk et al. |
| 2022/0083134 | A1 | 3/2022 | Kassner et al. |

FOREIGN PATENT DOCUMENTS

| | | |
|---|---|---|
| JP | 2019512726 A | 5/2019 |
| JP | 2019519859 A | 7/2019 |

OTHER PUBLICATIONS

International Search Report dated Dec. 14, 2021 for International Application No. PCT/IB2021/059332.
International Search Report dated Jan. 11, 2022 for International Application No. PCT/IB2021/059328.
International Search report dated Jan. 11, 2022 for International Application No. PCT/IB2021/059329.
Yamada "Characteristics of Head and Eye Co-ordination When Viewing Targets on a Two-dimensional Plane", NHK Technical Research R&D; May 15, 1994; No. 30. pp. 58-73.

* cited by examiner

1

100

200

CONTROL UNIT ~101

COMMUNICATION UNIT ~102

INFRARED LIGHT SOURCE ~141

CAMERA ~144

DISPLAY ~146

HEAD MOUNT DISPLAY

CONTROL UNIT ~201

COMMUNICATION UNIT ~202

DETECTION UNIT ~203

VIDEO PRODUCING UNIT ~204

VIDEO REPRODUCTION DEVICE

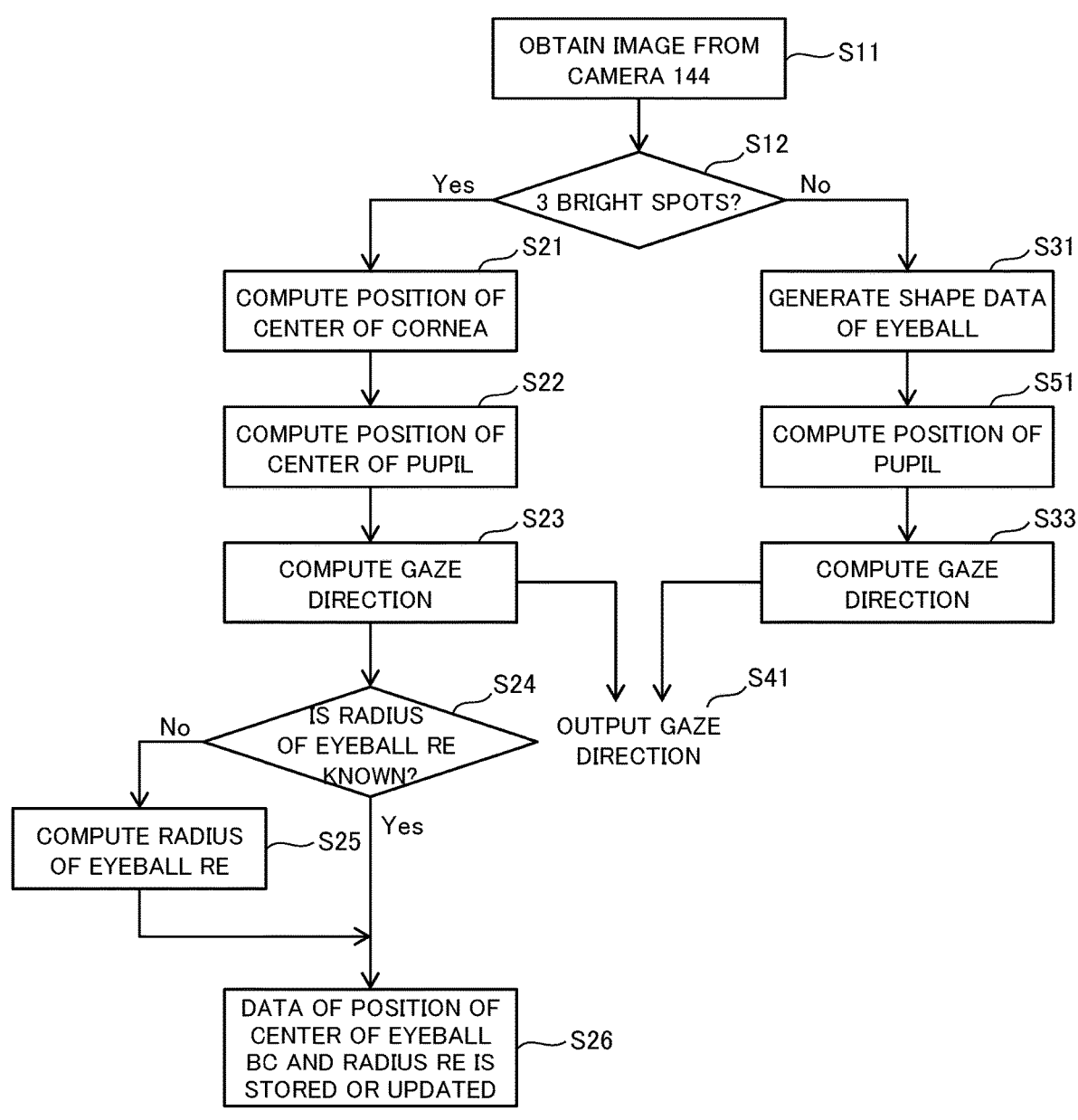

OBTAIN IMAGE FROM CAMERA 144 — S11

3 BRIGHT SPOTS? S12

Yes

No

COMPUTE POSITION OF CENTER OF CORNEA — S21

GENERATE SHAPE DATA OF EYEBALL — S31

COMPUTE POSITION OF CENTER OF PUPIL — S22

COMPUTE POSITION OF PUPIL — S51

COMPUTE GAZE DIRECTION — S23

COMPUTE GAZE DIRECTION — S33

IS RADIUS OF EYEBALL RE KNOWN? — S24

OUTPUT GAZE DIRECTION — S41

No

COMPUTE RADIUS OF EYEBALL RE — S25

Yes

DATA OF POSITION OF CENTER OF EYEBALL BC AND RADIUS RE IS STORED OR UPDATED — S26

Fig. 7

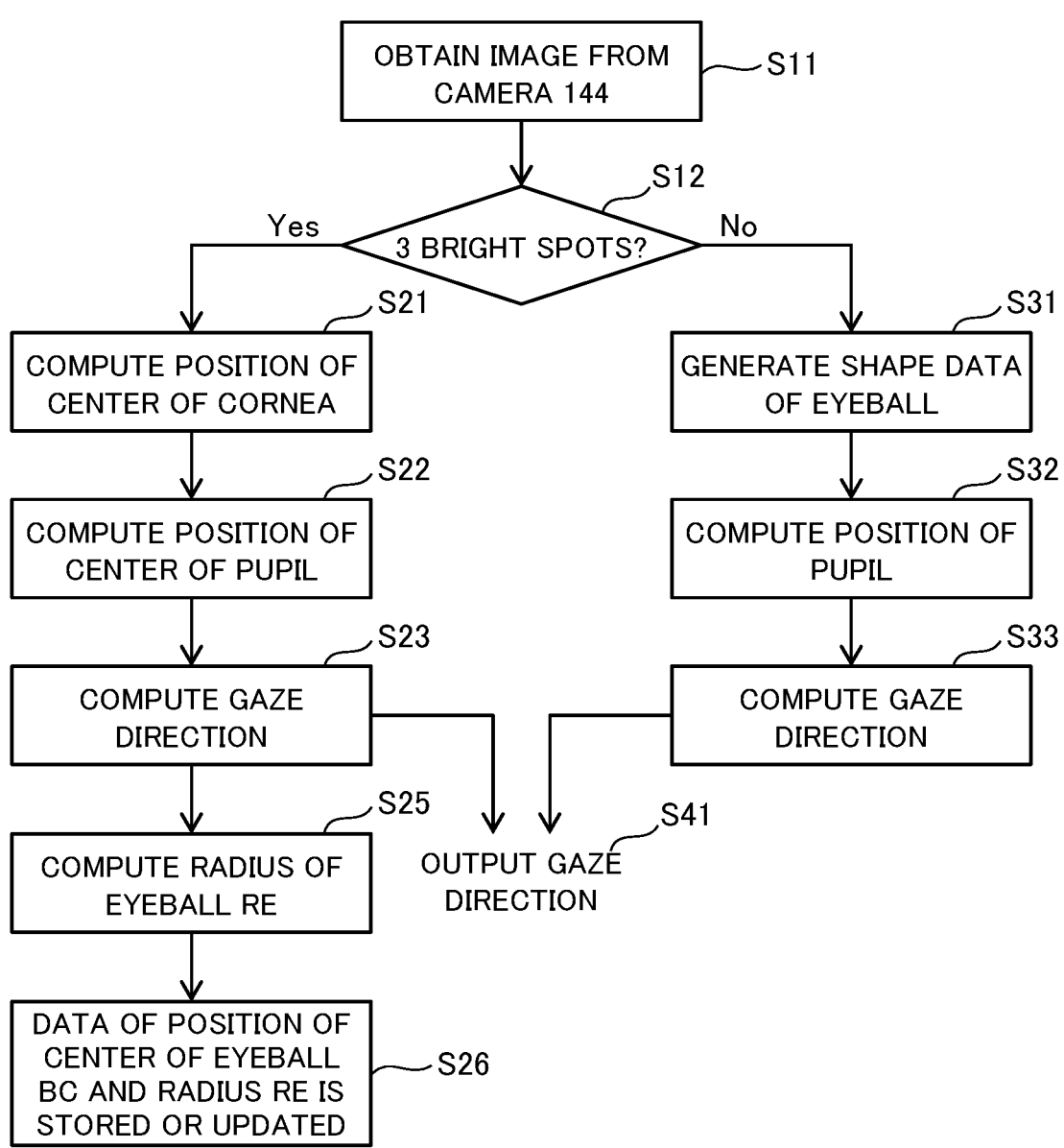

OBTAIN IMAGE FROM CAMERA 144 — S11

3 BRIGHT SPOTS? — S12

Yes

COMPUTE POSITION OF CENTER OF CORNEA — S21

COMPUTE POSITION OF CENTER OF PUPIL — S22

COMPUTE GAZE DIRECTION — S23

COMPUTE RADIUS OF EYEBALL RE — S25

DATA OF POSITION OF CENTER OF EYEBALL BC AND RADIUS RE IS STORED OR UPDATED — S26

No

GENERATE SHAPE DATA OF EYEBALL — S31

COMPUTE POSITION OF PUPIL — S32

COMPUTE GAZE DIRECTION — S33

OUTPUT GAZE DIRECTION — S41

Fig. 9

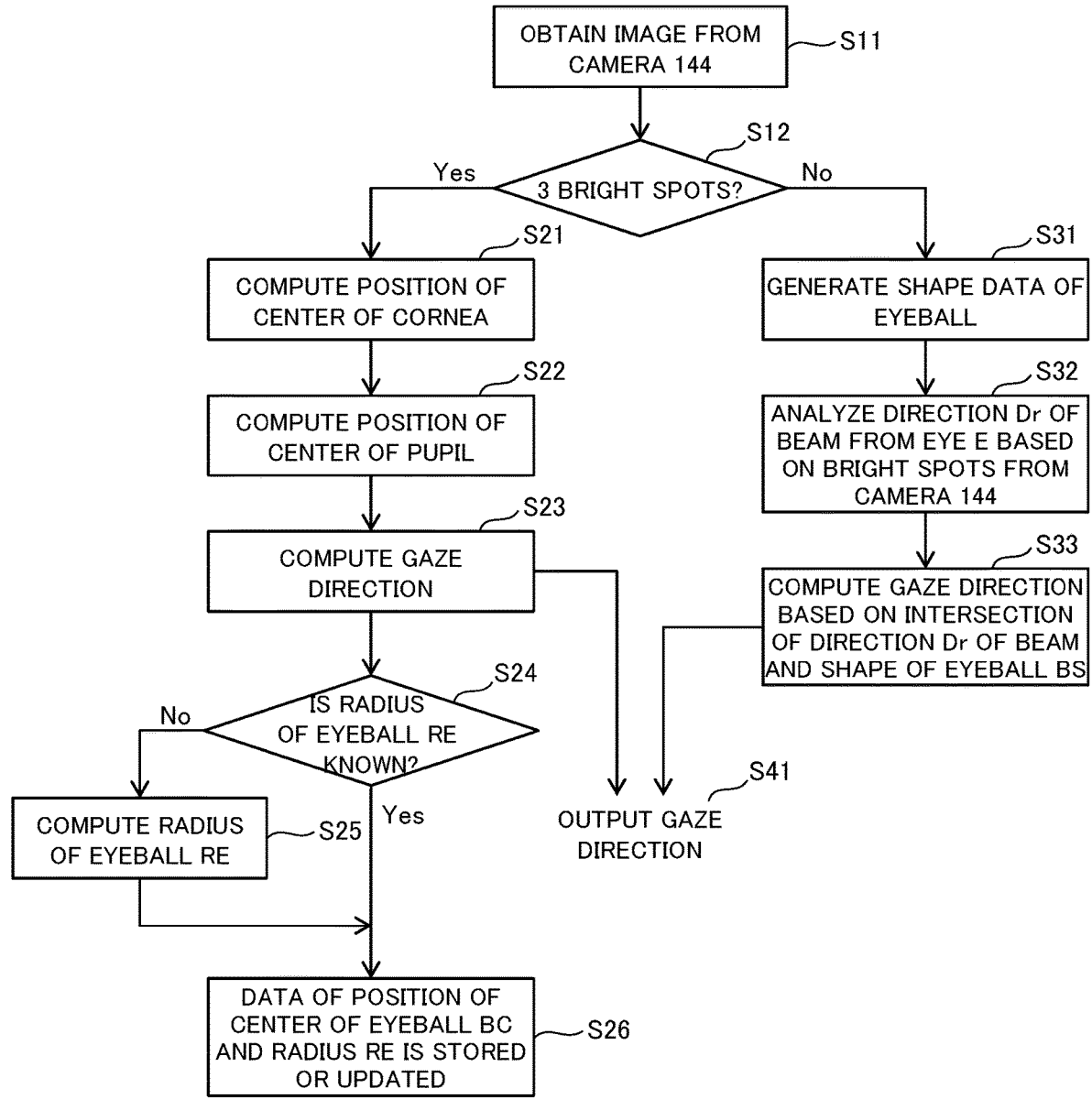

OBTAIN IMAGE FROM CAMERA 144 — S11

3 BRIGHT SPOTS? — S12

Yes

No

COMPUTE POSITION OF CENTER OF CORNEA — S21

COMPUTE POSITION OF CENTER OF PUPIL — S22

COMPUTE GAZE DIRECTION — S23

IS RADIUS OF EYEBALL RE KNOWN? — S24

No

Yes

COMPUTE RADIUS OF EYEBALL RE — S25

DATA OF POSITION OF CENTER OF EYEBALL BC AND RADIUS RE IS STORED OR UPDATED — S26

GENERATE SHAPE DATA OF EYEBALL — S31

ANALYZE DIRECTION Dr OF BEAM FROM EYE E BASED ON BRIGHT SPOTS FROM CAMERA 144 — S32

COMPUTE GAZE DIRECTION BASED ON INTERSECTION OF DIRECTION Dr OF BEAM AND SHAPE OF EYEBALL BS — S33

OUTPUT GAZE DIRECTION — S41

Fig. 11

VISUAL LINE DETECTION DEVICE AND VISUAL LINE DETECTION PROGRAM

TECHNICAL FIELD

The present invention relates to a gaze detection apparatus, a gaze detection program, and a head mount display for detecting a gaze.

BACKGROUND ART

In order to provide virtual reality (VR) in games and videos, the spread of head-mounted displays that can provide stereoscopic images is accelerating. A head mount display is an image providing device that provides a stereoscopic image to a user within a housing overlying the user's head. In such a head mount display, there is also known a device configured to vary the stereoscopic image, such as providing a gaze detector for detecting a user's gaze direction and improving the resolution only of the image in the gaze direction (see, e.g., Patent Literature 1).

The detection of the user's gaze is accomplished by illuminating the eye with infrared light and detecting the position of the bright spot of light in the image of the eye irradiated with infrared light. In order to accurately grasp the direction of the eye, it is required to irradiate a plurality of irradiated light from a plurality of light sources and observe a plurality of bright points on the cornea.

However, even if multiple light sources are used, it is difficult to observe multiple bright spots on the cornea at all times. For example, by blinking or by deflection of the housing of the head mount display, some of the plurality of bright spots may be projected out of the cornea, resulting in situations that are not available as information for gaze detection. In this case, the gaze direction cannot be accurately detected, and the desired operation cannot be performed with respect to the head mount display.

CITATION LIST

Patent Literature

[PTL 1] Japanese Patent Application Publication No. 2001-134371

SUMMARY OF INVENTION

Technical Problem

The present invention has been made in light of the above-described problems, and it is an object of the present invention to provide a gaze detection device even when multiple bright spots cannot be observed on the cornea.

Solution to Problem

In order to achieve the above-described object, the gaze detection apparatus in accordance with the present invention comprises a plurality of light sources illuminating the eye, an imaging device for imaging an image of the eye, and a processor. If the state of the bright spots observed on the cornea of the eye based on the plurality of light sources is in the first state, the processor:

(1-1) identifies the position of the center of the cornea based on a plurality of the bright spots;

(1-2) identifies the position of the pupil of the eye based on the image of the imaging device; and (1-3) identifies the gaze direction based on the position of the center of the cornea and the position of the pupil.

On the other hand, if the state of bright spots observed on the cornea of the eye based on the plurality of light sources is in the second state, the processor:

(2-1) identifies the shape of the eyeball according to data of the radius of the eyeball and the position of the center of the eyeball stored in the storage unit; and (2-2) identifies the gaze direction from the image of the imaging device and the position of the center of the eyeball.

Advantageous Effects of Invention

According to the present invention, a gaze detection apparatus can be provided even when multiple bright spots cannot be observed on the cornea.

BRIEF DESCRIPTION OF DRAWINGS

FIG. 7 is a flow chart illustrating a method of detecting the gaze direction using the detection unit 203 according to the first embodiment.

FIG. 9 is a flow chart illustrating a method of detecting the gaze direction using the detection unit 203 according to the second embodiment.

FIG. 11 is a flowchart illustrating a method of detecting a gaze direction according to another embodiment.

DESCRIPTION OF EMBODIMENTS

Figure 1:
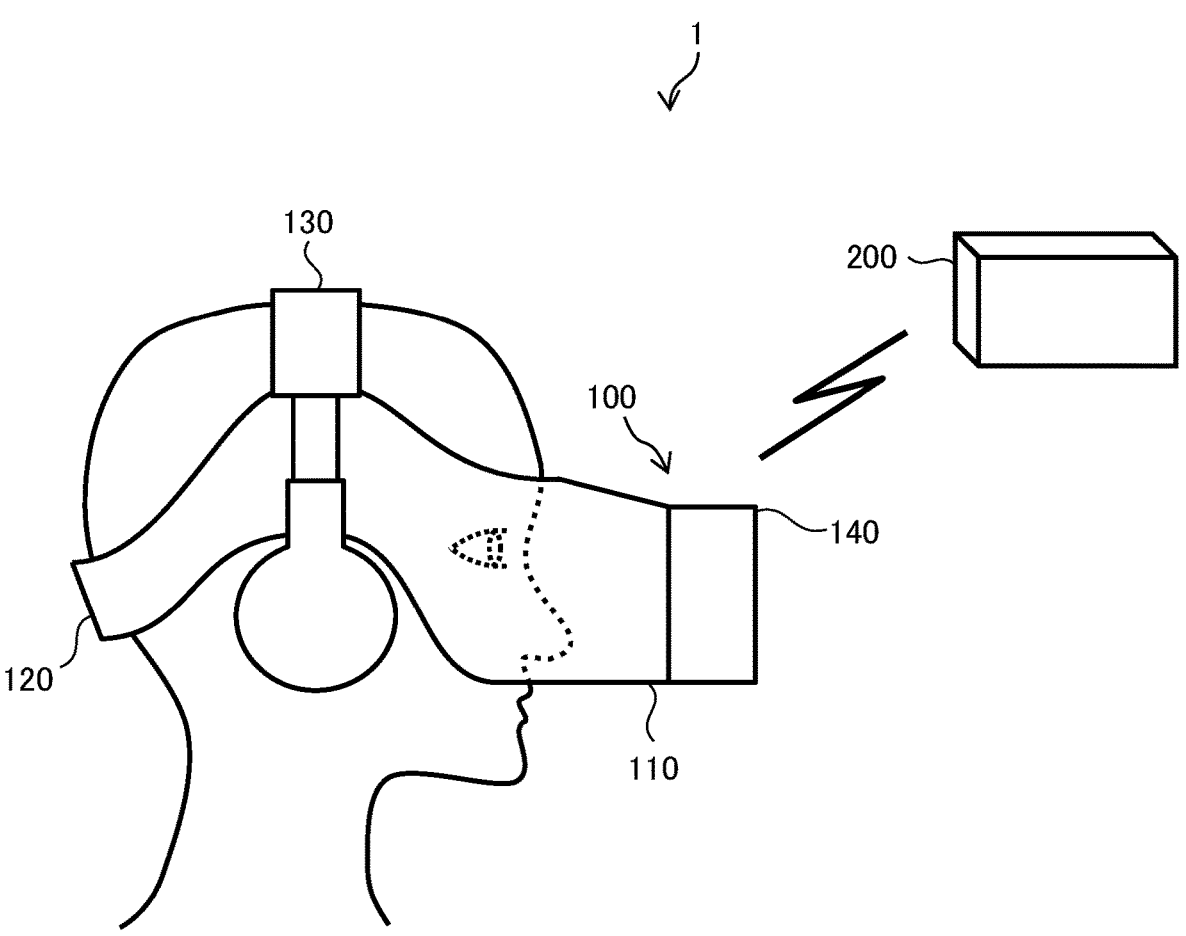
FIG. 1 is a schematic view illustrating an overview of the video system 1 according to the first embodiment.

Hereinafter, the present embodiment will be described with reference to the drawings. In the drawings, functionally identical elements may be represented by the same number. Although the drawings illustrate embodiments and implementations in accordance with the principles of the present disclosure, they are for the understanding of the present disclosure and are not used in any way to construe the present disclosure in a limiting manner. The description herein is merely an exemplary example and is not intended to limit the scope or application of the claims of the present disclosure in any sense.

In the present embodiment, the description is given in sufficient detail to enable a person skilled in the art to implement the present disclosure, but it is necessary to understand that other implementations and forms are possible, and that changes in configuration and structure and the substitution of various elements are possible without departing from the scope and spirit of the technical ideas of the present disclosure. Accordingly, the following statements shall not be construed as limiting them.

First Embodiment

Referring to FIG. 1, the video system 1 according to the first embodiment will be described. FIG. 1 is a diagram schematically illustrating an overview of the video system 1. The video system 1 according to the first embodiment includes the head mount display 100 and the video reproduction device 200. As shown in FIG. 1, the head mount display 100 may be the shielded head mount display that is mounted on the user's head.

The video reproduction device 200 generates the image data displayed by the head mount display 100 and transmits the image data to the head mount display 100 either by wire or wirelessly. As an example, the video reproduction device 200 is a device capable of playing back images such as a personal computer, a stationary game machine, a portable game machine, a tablet terminal, a smartphone, a fablet, a video player, a television, and the like.

The wireless connection between the video reproduction device 200 and the head mount display 100 can be realized using, for example, known Wi-Fi, Bluetooth, infrared communication, and the like. The transmission of the image between the head mount display 100 and the video reproduction device 200 is also carried out in accordance with standards such as Miracast (trademark), WiGig (trademark), WHDI (trademark), or Ethernet (trademark). The video reproduction device 200 may be integral with the head mount display 100 or may be incorporated into the head mount display 100.

The head mount display 100 includes the housing 110, the head fixture 120, the headphone 130, and the image display unit 140. As described below, the housing 110 includes the transmission module and various sensors in addition to the image display unit 140. The head fixture 120 is a member that mounts the head mount display 100 to the user's head. The headphone 130 outputs the sound of the video to be played by the video reproduction device 200. Although not shown, the head mount display 100 may include a gyro sensor for detecting the inclination direction or the like of the head mount display 100. The video reproduction device 200 can change the display state of the image according to the detection result of the gyroscope. The image display unit 140 is housed in the housing 110 and displays an image transmitted from the video reproduction device 200.

Figure 2:
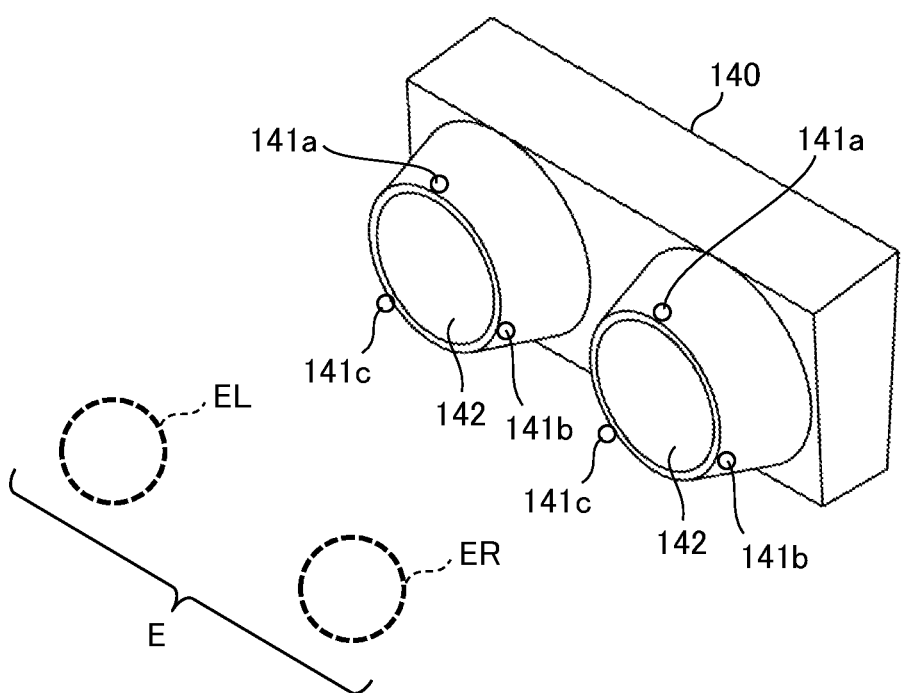
FIG. 2 is a perspective view schematically illustrating the configuration of the image display unit 140 according to the first embodiment.
Figure 3:
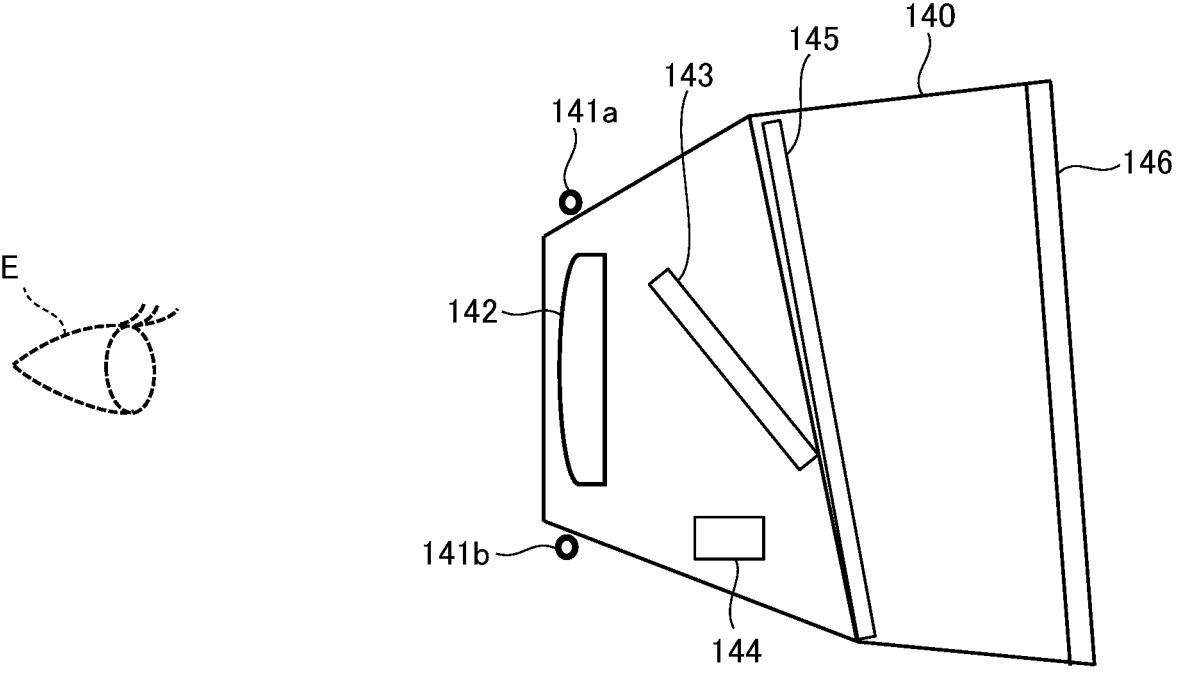
FIG. 3 is a schematic cross-sectional view schematically illustrating the configuration of the image display unit 140 according to the first embodiment.
Figure 4:
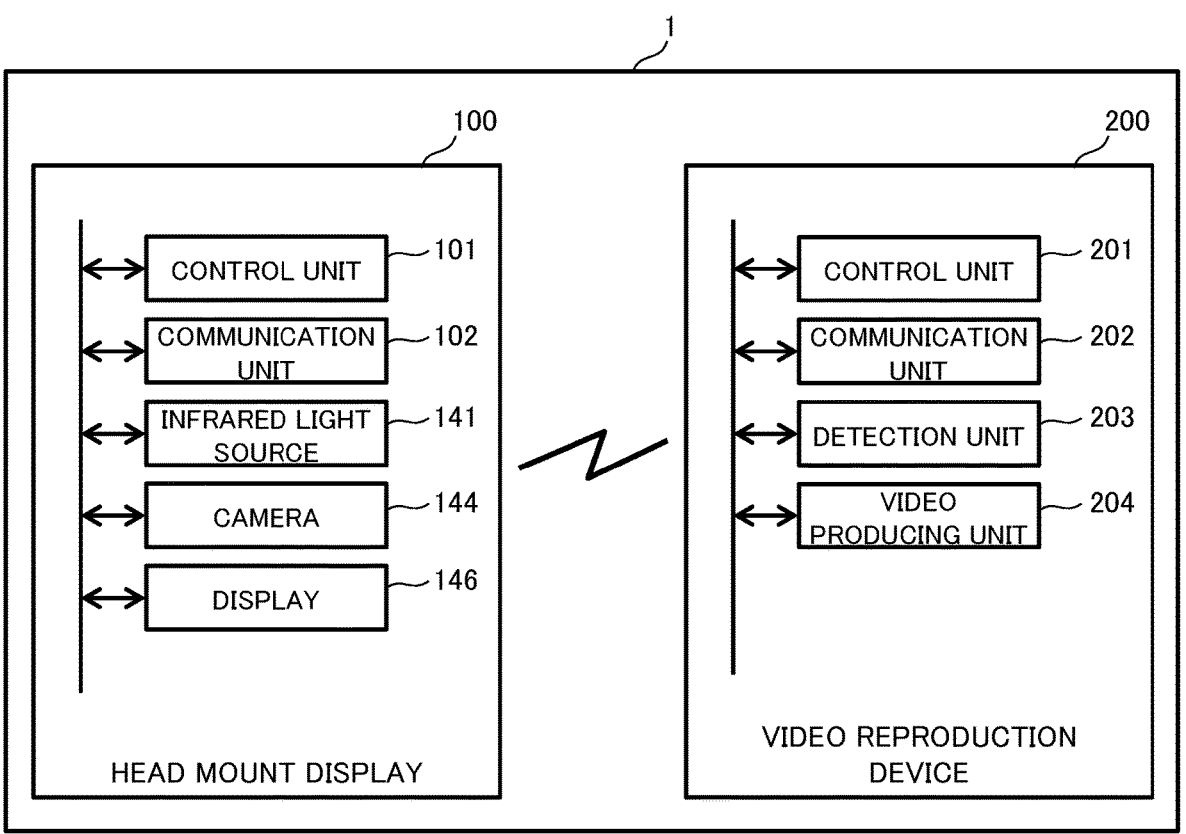
FIG. 4 is a block diagram illustrating a configuration of main parts of the head mount display 100 and the video reproduction apparatus 200 according to the first embodiment.

FIG. 2 is a perspective view schematically illustrating the configuration of the image display unit 140, and FIG. 3 is a schematic cross-sectional view thereof. FIG. 4 is a block diagram illustrating a configuration of main parts of the head mount display 100 and the video reproduction device 200.

As shown in FIG. 2, the image display unit 140 presents an image to each of the user's left and right eyes E (EL, ER), thereby allowing the user to present a three-dimensional image. As shown in FIG. 3, the image display unit 140 includes the infrared light source 141 (141a-c), the objective lens 142, the half mirror 143, the camera 144, the hot mirror 145, and the display 146. Since the configuration of the image display unit 140 is the same in the right and left eyes E, only the configuration on the right and left sides will be described below.

The infrared light source 141 is a light source for detecting the center of the pupil of the eye, the center of the cornea, and further for detecting the center of the eyeball, and for detecting the gaze of eye E, which is capable of illuminating a near infrared wavelength band of light (about 780 nm to 2500 nm). At least three or more infrared light sources 141 are provided. As an example, three infrared light sources 141a-c are provided (infrared light sources 141c are not shown in FIG. 3). Hereinafter, the infrared light source 141a-c is collectively referred to as an "infrared light source 141."

The objective lens 142 is provided to be located in front of the user's eye E when using the head mount display 100. The infrared light sources 141a-c may be provided around the objective lens 142. Here, the three infrared light sources 141a-c are preferably disposed at least in a non-linear position with respect to the optical axis of the objective lens 142 and preferably at approximately equal angles around the optical axis.

The optical path between the objective lens 142 and the display 146 is provided with the half mirror 143 and the hot mirror 145. The half mirror 143 transmits a portion of the light from eye E and reflects the rest. The optical path of the half mirror 143 is provided with the camera 144 and the optical path of the transmitted side is provided with the hot mirror 145.

The camera 144 is an imaging device for imaging an image of the eye E in which lights from infrared light sources 141a-141c is projected and bright spots are formed based on the lights. An image of the eye containing this bright spot is used to detect the center of the pupil of the eye and the center of the cornea, and hence the gaze direction of the eye. The display 146 is an image display device for displaying images transmitted from video reproduction device 200, which may be implemented, for example, using known liquid crystal displays or organic EL displays. The hot mirror 145 has the property that visible light emitted by the display 146 is transmitted while near infrared light is reflected.

The infrared light reaching the user's eye E from the infrared light sources 141a-c is reflected by the eye E and directed toward the objective lens 142. A portion of the light transmitted through the objective lens 142 is reflected by the half mirror 143 and enters the camera 144. The camera 144 may include a filter (not shown) that blocks visible light.

As shown in the block diagram of FIG. 4, the head mount display 100 includes the control unit 101 and the communication unit 102 in addition to the infrared light source 141, the camera 144, and the display 146. The control unit 101 controls the entire head mount display 100 including the infrared light source 141, the camera 144, and the display 146. The communication unit 102 performs data communication between the video reproduction device 200.

The video reproduction device 200 includes the detection unit 203 and the control unit 201 (processor) for controlling the video producing unit 204, and the communication unit 202 for controlling data communication between the head mount display 100. The communication unit 202 communicates with the communication unit 102 in the head mount display 100 and receives various data obtained in the head mount display 100 to supply the control unit 201. Conversely, the communication unit 202 transmits data obtained in the video reproduction device 200 to the head mount display 100. The video reproduction device 200 includes the detection unit 203 and the video producing unit 204.

The detection unit 203 detects the center of the pupil of the user's eye, the position of the center of the cornea, and even the position of the center of the eyeball based on the image of eye E imaged by the camera 144 with infrared light from the infrared light sources 141*a-c* projected to eye E. The detection unit 203 then detects the gaze direction of eye E based on the data of the center of the pupil, the center of the cornea, and/or the center of the eyeball. The detection unit 203 employs a different gaze detection technique according to the number of bright spots of the infrared light sources 141*a-c* that can be viewed on the cornea of eye E.

If the positions of three bright spots on the eye E based on three infrared light sources 141 are observable (first state), the detection unit 203 locates the center of the pupil and identifies the position of the center of the cornea, thereby detecting the gaze vector. The gaze vector is detected at different time intervals and the position of the center of the eyeball is detected based on the position of the intersection of the gaze vector. When the position of the center of the eyeball is detected, the data of the radius of the eyeball is also computed based on the data of the position of the center of the detected pupil, etc.

On the other hand, when only less than three bright spots are observable on the cornea of the eye E (the second state), the detection unit 203 uses data on the position of the center of the eyeball and the radius of the eyeball stored in the storage unit to generate the eyeball model data and further locate the pupil. The vector from the center of the eyeball to the center of the pupil is then detected as a gaze vector, i.e. the gaze direction. This is discussed in more detail later.

The video reproduction device 200 may be a personal computer, a stationary game machine, a portable game machine, a tablet terminal, a smartphone, a fablet, a video player, or the like, as described above. The detection unit 203 may be implemented, for example, by an image signal processor (ISP: Image Signal Processor) included in a PC or the like and an image processing program stored in a storage device. The image processing program may be stored in a built-in storage device such as a ROM or a RAM, or it may be stored in a portable storage device such as a memory card, a DVD-RAM, or a CD-ROM.

If the head mount display 100 includes the memory and the control unit 101 and the memory can function as a computing resource, the control unit 101 of the head mount display 100 may execute a program for realizing the gaze detection unit. Similarly, instead of the detection unit 203, a program in which the control unit (processor) 201 of the video reproduction device 200 implements the gaze detection unit may be executed.

The video producing unit 204 has the function of generating an image to be displayed in the display 146 according to a detection signal of a gyro sensor (not shown). In addition to the output of the gyro sensor or the like, the video producing unit 204 may change the generated image according to the detection result of the detection unit 203.

Next, a method of detecting the gaze direction using the detection unit 203 according to the first embodiment will be described with reference to FIGS. 5 to 9.

Figure 5:
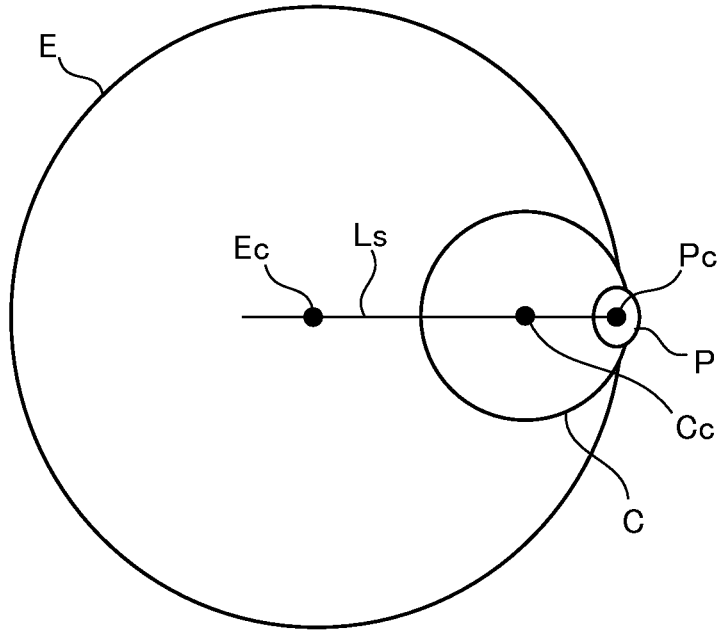
FIG. 5 is a schematic diagram illustrating a method of detecting the gaze direction using the detection unit 203 according to the first embodiment.

As shown in FIG. 5, the human eye E has the eyeball B with the center of the eyeball Bc and the cornea C formed in part of the eyeball B. The cornea C has a radius (corneal radius) different from that of eyeball B, and its curvature is determined by the center of the cornea Cc. The interior of the cornea C contains the iris, the hole portion formed in the center of the iris is the pupil P. The center of the pupil Pc at the center of the pupil P, the center of the cornea Cc, and the center of the eyeball Bc line up on a straight-line Ls. The straight-line Ls is the gaze direction the eye E. Accordingly, when detecting the gaze direction of the eye E, it is possible to identify the gaze direction (straight line Ls) of the eye E by identifying the center of the eyeball Bc, the center of the pupil Pc, and the center of the cornea Cc.

Figure 6:
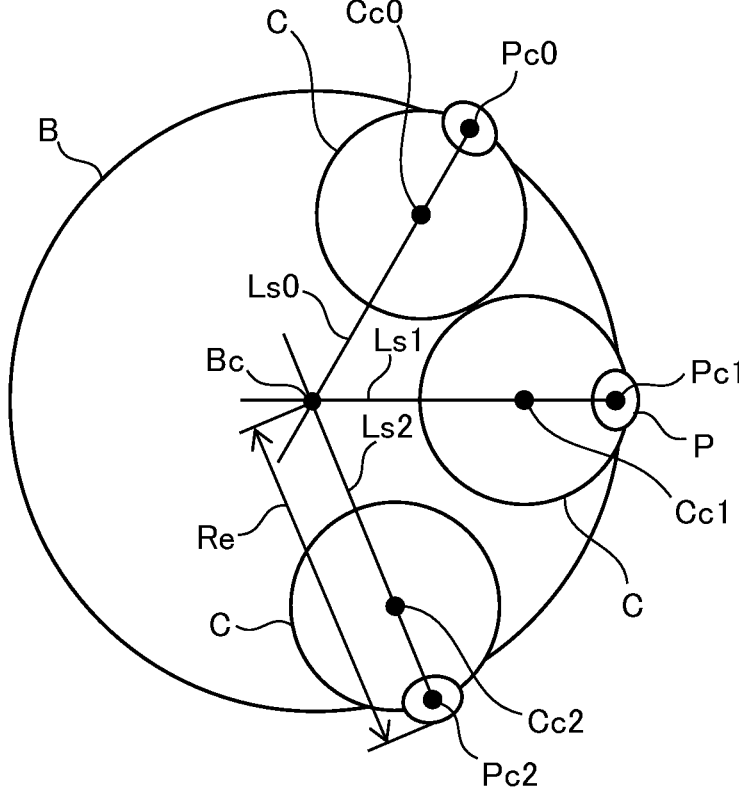
FIG. 6 is a schematic diagram illustrating a method of detecting the gaze direction using the detection unit 203 according to the first embodiment.

In the case of the video system 1 as shown in FIG. 1, the user's head is secured to the head mount display 100. As shown in FIG. 6, the gaze direction of the eye E may be altered by rotation of the eye B about the center of the eyeball Bc. In this embodiment, the positions of the center of the pupil Pc (Pc0-2), and the center of the cornea Cc (Cc0-2) are specified at a plurality of different timings, and the straight-line Ls (Ls0-2) connecting the center of the pupil Pc to the center of the cornea Cc is further specified at different times when the gaze direction changes over time.

The intersection of the identified straight-line Ls is identified as the center of the eyeball Bc. In addition, the difference (distance) between the center of the eyeball Bc and the center of the pupil Pc is specified as the radius Re of the eyeball B. It should be noted that multiple straight lines Ls may not intersect at one point. In this case, the closest point (nearest point) may be computed from the plurality of straight lines Ls using the least squares method, etc., to obtain the center of the eyeball Bc. It should be noted that the position of the center of the eyeball Bc is presumed to be constant unless the user's head is displaced relative to the head mount display 100. Accordingly, in this embodiment, the position information of the identified center of the eyeball Bc is stored in the storage unit and used for subsequent identification of the gaze direction.

Next, the procedure of detecting the gaze direction of the video system 1 according to the present embodiment will be described with reference to the flowchart of FIG. 7. In this embodiment, as described above, the detection unit 203 employs a different gaze detection technique according to the number of bright spots the infrared light sources 141*a-c* observable on the cornea of the eye E.

When the image of the eye E is imaged at the camera 144 with light from the infrared light sources 141*a-c* projected (step S11), the detection unit 203 counts the number of bright spots formed on the cornea C in the image (step S12). If three bright spots are observed on the cornea C, proceed to step S21. On the other hand, if the number of bright points observed on the cornea C is 2 spots or less, proceed to step S31.

In step S21, the detection unit 203 analyzes the position of the three observed bright spots and computes the position of the center of the the cornea Cc of the cornea C. In a subsequent step S22, the detection unit 203 identifies the pupil P in the image captured by the camera 144 and computes the position of the center of the pupil Pc. In step 523, the straight-line Ls connecting the center of the cornea Cc and the center of the pupil Pc computed in step S21 and step S22 is computed as the gaze direction of the eye E. The computed gaze direction is output to the control unit 201.

The control unit 201 performs various controls in the head mount display 100 and the video reproduction device 200 according to the obtained data in the gaze direction. The data of the straight-line Ls representing the gaze direction is computed at a predetermined time interval and stored in the memory (not shown) of the detection unit 203. For example, at times t0, t1, t2, and the like, data of different straight lines Ls0, Ls1, Ls2, and the like are computed and stored.

In the following step S24, it is determined whether or not the radius Re of the eyeball B is known and already stored in the memory (not shown) possessed by the detection unit 203. If the radius of the eyeball B is not known and is not stored in memory (No), proceed to step S25 and compute the radius Re of the eyeball B according to the above-described linear Ls data. Specifically, as shown in FIG. 6, three or more straight lines Ls (Ls0 to Ls2) are obtained, and the intersection point of the three or more straight lines Ls or the nearest adjacent point is obtained to determine the position of the center of the eyeball Bc of the eyeball B. Once the position of the center of the eyeball Bc is located, the radius of eyeball B is determined by its relationship to the position of the center of the pupil Pc. In step S26, the position data of the center of the eyeball Bc of the eyeball B obtained in this manner and the value of the radius Re are stored in the memory of the detection unit 203.

Meanwhile, in step S24, if the radius Re of the eyeball B and the position of the center of the eyeball Bc of the eyeball B are already stored in memory (Yes), step S25 is omitted. However, even if the radius Re of the eyeball B and the position of the center of the eyeball Bc of the eyeball B are already stored in memory, step S25 may be performed periodically to compute the data of the eyeball radius Re and the eyeball center Bc and update the memory storage data.

The above operation is performed in step S12 when the number of bright spots observed on the cornea C is 3, but the number of bright spots observed is 2 or less (Steps S31 to S33) will be described below. As described above, even if multiple (e.g., three) infrared light sources 141*a-c* are used, multiple bright spots may not always be observed on the cornea C. In this case, it is impossible to locate the center of the cornea C, and it is difficult to detect the gaze direction based on this. However, in the present embodiment, the center of the eyeball Bc is pre-specified, and the position data is stored in memory, and the gaze direction can be detected based on the center of the eyeball Bc and the position data of the center of the pupil Pc. Hereinafter, the procedure (steps S31 to 33) will be described.

Figure 8:
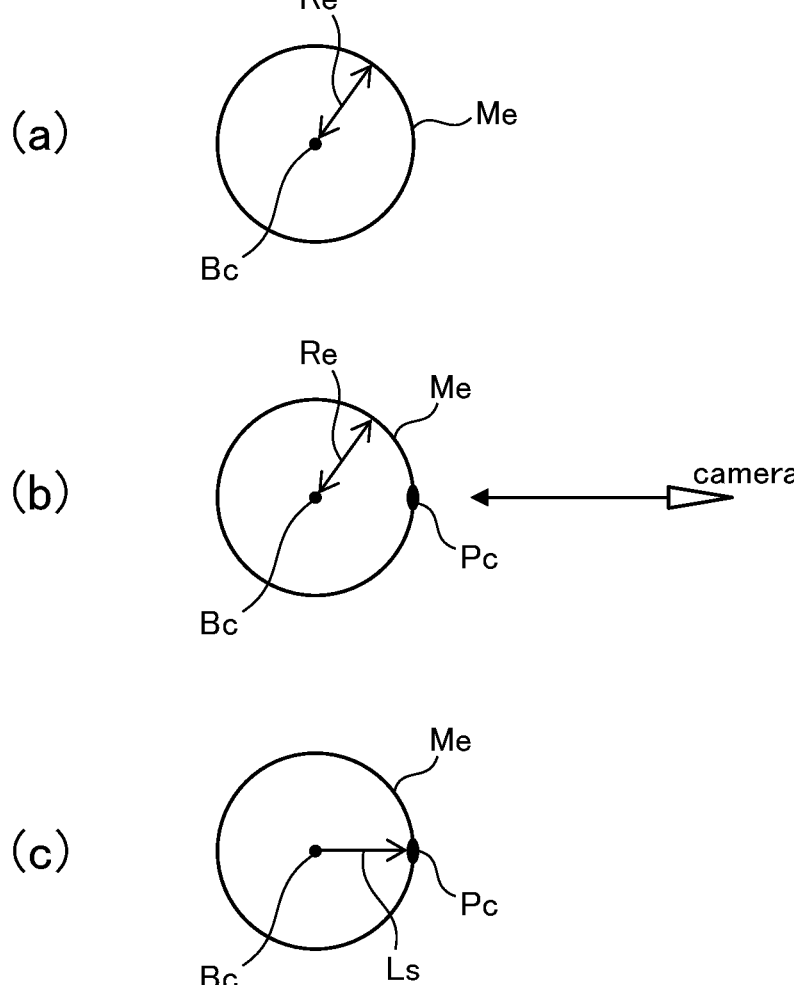
FIG. 8 is a schematic diagram illustrating a method of detecting the gaze direction using the detection unit 203 according to the first embodiment.

In step S31, the position of the center of the eyeball Bc and the radius Re of the eyeball B, which are the shape data of the eyeball B stored in the memory of the detection unit 203 are read out. As shown in FIG. 8(*a*), the detection unit 203 generates the shape data Me of the eyeball B based on the position data of the read position of the center of the eyeball Bc and the radius Re.

Subsequently, in step S32, the position data of the center of the pupil Pc of the pupil P is computed according to the imaging image of the camera 144 as shown in FIG. 8*b*. In step S33, the data of the straight-line Ls connecting the center of the eyeball Bc to the center of the pupil Pc is computed (see FIG. 8(*c*)), and this line Ls is specified as the gaze direction.

In the above description, the infrared light source 141 was described as having three infrared light sources for each of the right and left eyes. However, this is only one example, and the number of infrared light sources provided for each of the eyes E may be four or more. In the above example, in step S12, the method of detecting the gaze direction is switched depending on whether or not three or more bright spots are observed on the cornea C. However, this is an example, and it is needless to say that a plurality of detection methods may be switched based on other criteria.

As described above, in the system of the first embodiment, the gaze direction is detectable by projecting a beam from the plurality of infrared light sources, determining the position of the center of the cornea Cc based on the plurality of bright spots formed on the cornea C, and determining the position of the center of the pupil Pc. Even if multiple bright spots cannot be observed on the cornea C, the gaze direction can be detected according to the data of the pre-stored center of the eyeball Bc and the data of the center of the pupil Pc. Accordingly, according to the present embodiment, it is possible to accurately detect the gaze direction regardless of the change in the situation.

Second Embodiment

Next, the video system 1 according to the second embodiment will be described with reference to FIG. 9. FIG. 9 is a flowchart illustrating a procedure for executing the gaze detection operation in the video system 1. Since the overall configuration of the video system according to the second embodiment is substantially the same as that of the first embodiment (FIGS. 1 to 4), overlapping descriptions are omitted. In this second embodiment, as shown in FIG. 9, step S24 of FIG. 7 is omitted, and each time the radius Re of the eyeball is computed regardless of whether or not the radius Re of the eyeball is known, the data of the radius Re of the eyeball and the position of the center Bc of the eyeball are updated. The second embodiment may also have the same effect as the first embodiment.

Third Embodiment

Figure 10:
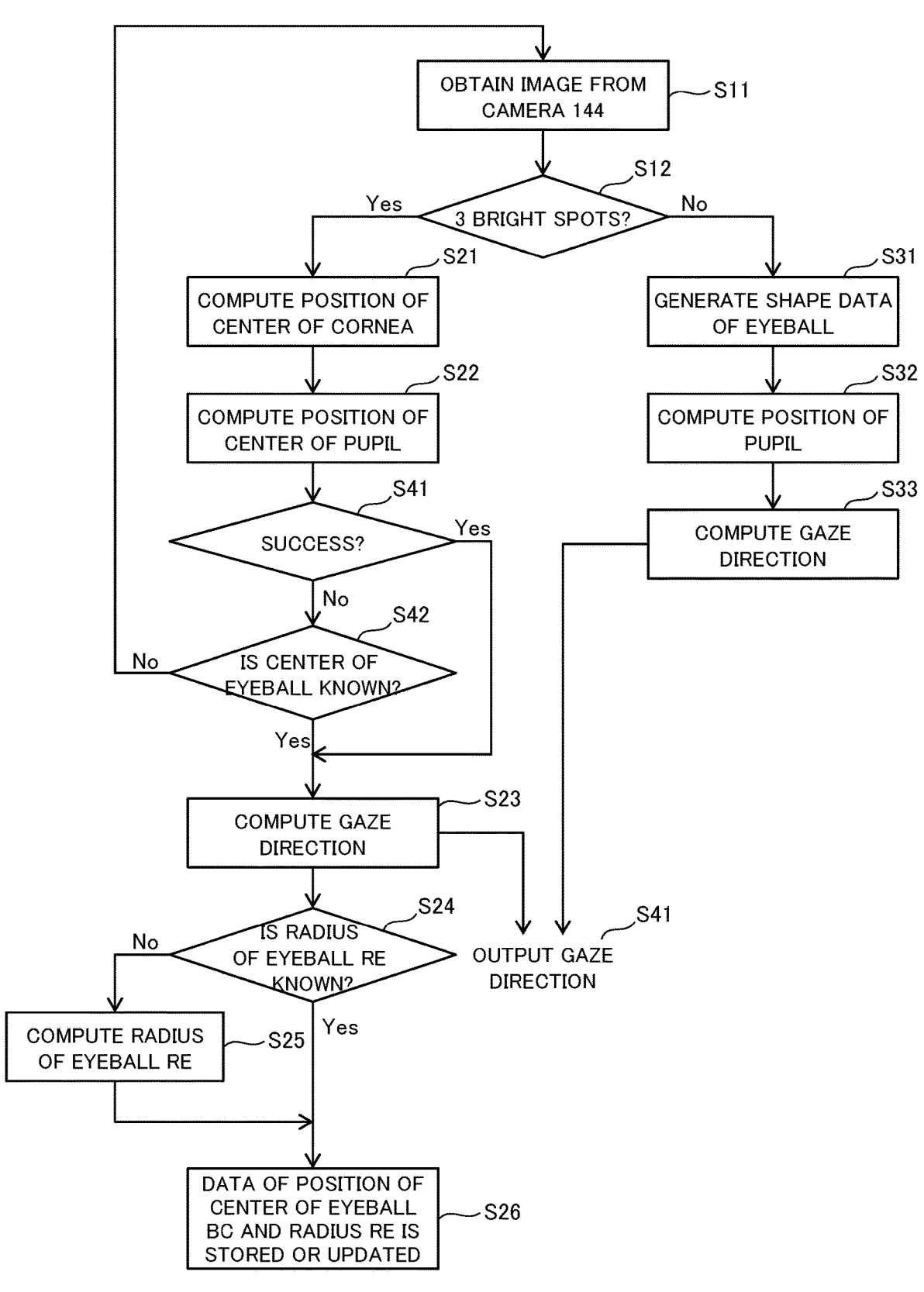
FIG. 10 is a flowchart illustrating a method of detecting a gaze direction according to another embodiment.

Next, the video system 1 according to a third embodiment will be described with reference to FIG. 10. FIG. 10 is a flowchart illustrating a procedure for executing the gaze detection operation in the video system 1. Since the overall configuration of the video system according to the third embodiment is substantially the same as that of the first embodiment (FIGS. 1 to 4), overlapping descriptions are omitted. The gaze detection operation (FIG. 10) in this third embodiment differs from the first embodiment (FIG. 7) in the procedure for detecting the center of the pupil Pc. In FIG. 10, since the operation of the block with the same step number as in FIG. 7 is the same, the description is omitted below.

In FIG. 10, the position of the center of the pupil Pc is detected in step S22, but the operation is different when the detection is successful or fails. If successful (Yes in step S41), the procedure of the gaze detection proceeds in the same manner as in the first embodiment (steps S23 to S26). In the case of failure (No. of step S41), it is determined whether or not the center of the eyeball Bc is known (step S42). If known (Yes), gaze detection based on the center of the pupil Pc and the center of the cornea Cc is performed instead (step S23). If not known, there is a lack of information for gaze detection, so no gaze detection is performed, and the process returns to step S11.

According to this third embodiment, even if the detection of the position of the center of the pupil Pc fails, if the position of the center of the cornea Cc is detected and the position of the center of the eyeball Bc is obtained, the gaze detection can be performed. Accordingly, compared to the aforementioned embodiments, there is an increased opportunity to perform gaze detection and to more accurately perform a given operation of the head mount display.

Fourth Embodiment

Figure 12:
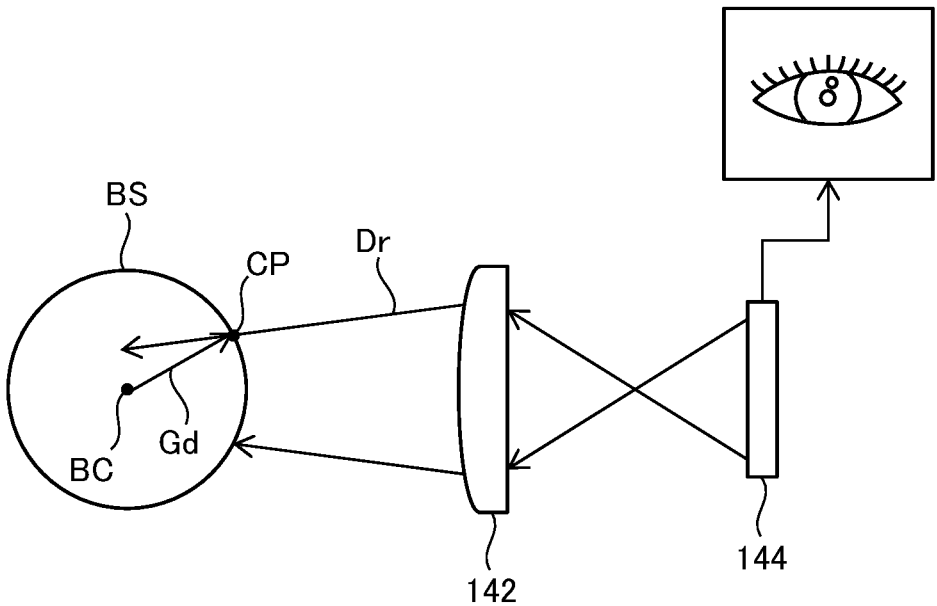
FIG. 12 is a schematic diagram illustrating an optical configuration for detecting a gaze direction according to another embodiment.

Next, the video system 1 according to the fourth embodiment will be described with reference to FIGS. 11 and 12. FIG. 11 is a flowchart illustrating a procedure for executing the gaze detection operation in the video system 1, and FIG. 12 is a schematic diagram illustrating an operation of the fourth embodiment. Since the overall configuration of the video system according to the fourth embodiment is substantially the same as that of the first embodiment (FIGS. 1 to 4), overlapping descriptions are omitted.

The gaze detection operation (FIG. 11) in this fourth embodiment differs from the first embodiment (FIG. 7) in that the operation is performed after the number of bright spots is determined to be less than three (after the determination of No in step S12). Specifically, in this third embodiment, when the number of bright spots is determined to be less than 3 points, the gaze direction is detected based on the shape data of the eyeball BS and the direction Dr of the line toward the eyeball. In FIG. 11, since the operation of the block with the same step number as in FIG. 7 is the same, the description will be omitted below.

In this fourth embodiment, after generating the shape data of the eyeball BS in step S31, the position of the center of the pupil CP in the camera 144 is detected as shown in FIG. 12, and the direction Dr of the line from the camera 144 to the center of the pupil CP is analyzed via the optical system such as the lens 142 according to this detection information (step S32A). The direction Dr from camera 144 toward the center of the pupil CP can be computed from the center of the pupil of 2D in the 2D image by camera 144. From the center of the eyeball Bc, the direction Dr of the line, and the direction Gd towards the intersection of the shape data of the eyeball BS, are identified as the gaze direction.

As described above, according to this fourth embodiment, the direction Dr of the line toward the center of the pupil CP is analyzed, and the gaze direction is analyzed according to this direction Dr and the shape data of the eyeball. This method can also obtain the same effect as the above-described embodiment.

[Others]

The present invention is not limited to the above-described embodiments but includes various modifications. For example, the above-described embodiments are described in detail in order to explain the present invention in an easy-to-understand manner and are not necessarily limited to those having all the configurations described. It is also possible to replace a portion of the configuration of one embodiment with the configuration of another embodiment, and to add a configuration of another embodiment to the configuration of one embodiment. In addition, it is possible to add, delete, or replace another configuration with a part of the configuration of each embodiment. For example, although the above-described embodiments primarily illustrate examples of incorporating the gaze detection device in the video system having the head mount display 100, the scope of the gaze detection device of the present invention is not limited thereto and may be applied to various devices and systems that may employ the gaze detection function.

In the above-described embodiment, the processor in the gaze detection device executes a gaze detection program, etc. to specify the gaze direction, etc. of the user. However, the gaze detection device may be implemented by hardware such as logic circuits or dedicated circuits formed in the integrated circuit. These circuits may also be implemented by one or more integrated circuits, and the functions of the plurality of functional portions illustrated in the above-described embodiments may be implemented by one integrated circuit.

The gaze detection program may be recorded on a recording medium readable by the processor, and a "non-transient tangible medium" may be used as the recording medium, for example, a tape, a disk, a card, a semiconductor memory, a programmable logic circuit, or the like.

REFERENCE SIGNS LIST

1 . . . Image System, 100 . . . Head Mount Display, 101 . . . Control Unit, 102 . . . Communication Unit, 110 . . . Housing, 120 . . . Head Fixture, 130 . . . Headphone, 140 . . . Image Display Unit, 141, 141*a-c* . . . Infrared Light Sources, 142 . . . Objective Lens, 143 . . . Half Mirror, 144 . . . Camera, 145 . . . Hot Mirror, 146 . . . Display, 200 . . . Video Reproduction Device, 201 . . . Control Unit, . . . 202 Communication Unit, 203 . . . Detection Unit, 204 . . . Video Producing Unit, B . . . Eyeball, Bc . . . Center of Eyeball, C . . . Cornea, Cc . . . Center of Cornea, E . . . Eye, Ls . . . Straight-Line, Me . . . Shape Data, P . . . Pupil, Pc . . . Center of Pupil, Re . . . Radius of Eye

The invention claimed is:

1. A gaze detection apparatus comprising:
a plurality of light sources illuminating an eye;
an imaging device for imaging an image of the eye; and
a processor,
wherein the processor:
if a state of a bright spot observed on a cornea of the eye based on the plurality of light sources is in a first state,
(1-1) identifies a position of a center of the cornea based on a plurality of the bright spots;
(1-2) identifies a position of a pupil of the eye based on the image of the imaging device; and
(1-3) identifies a gaze direction based on the position of the center of the cornea and the position of the pupil, and
if the state of the bright spot observed on the cornea of the eye based on the plurality of light sources is in a second state,
(2-1) identifies a shape of an eyeball according to data of a radius of the eyeball and a position of a center of the eyeball stored in a storage unit; and
(2-2) identifies the gaze direction from the image of the imaging device and the position of the center of the eyeball.

2. The gaze detection apparatus according to claim 1, wherein the processor is configured to identify and store a radius of the eyeball and a position of the center of the eyeball according to data of the gaze directions acquired at a plurality of timings.

3. The gaze detection apparatus according to claim 1, wherein the processor identifies the position of the center of the eyeball by finding an intersection of a plurality of specified gaze, and defines the radius of the eyeball based on a difference between a center position of the eye and a position of the pupil.

4. The gaze detection apparatus according to claim 1, wherein the processor, in the second state, identifies the position of the pupil from the image of the imaging device and defines the gaze direction based on the position of the center of the eyeball and the position of the pupil.

5. The gaze detection apparatus according to claim 1, wherein, when the processor, in the first state, fails to identify the position of the pupil of the eye, the processor identifies the gaze direction according to the shape of the eye and the position of the center of the cornea.

6. The gaze detection apparatus according to claim 1, wherein the processor, in the second state, identifies the direction of a beam emitted from the eye from an image of the imaging device, and identifies the gaze direction based on a center position of the eye and the direction of the beam.

7. A non-transitory computer-readable medium storing a gaze detection program for detecting a gaze direction of an eye, the program comprising instructions that, when executed by a processor of a computer system, cause the computer system to perform operations comprising:

illuminating the eye from a plurality of light sources, and determining a state of a bright spot observed on a cornea of an eye;

if the state is in a first state, (1-1) identifying a position of a center of the cornea based on a plurality of the bright spots;

(1-2) identifying a position of a pupil of the eye based on the image of the eye, (1-3) identifying a gaze direction based on the position of the center of the cornea and the position of the pupil;

on the other hand, if the state of the bright spot observed on the cornea of the eye based on the plurality of light sources is a second state, (2-1) identifying a shape of an eyeball according to data of a radius of the eyeball stored in a storage unit and the position of the center of the eyeball; and (2-2) identifying the gaze direction from the image of the eye and the position of the center of the eyeball.

8. The non-transitory computer-readable medium of claim 7, wherein a radius of the eyeball and the position of the center of the eyeball is identified and stored in the storage unit.

9. The non-transitory computer-readable medium of claim 7, wherein the position of the center of the eyeball is identified by computing an intersection of a identified gazes, and the radius of the eyeball is identified based on a difference between the position of the center of the eyeball and a position of the pupil.

10. The non-transitory computer-readable medium of claim 7, wherein in the second state, the position of the pupil is located from the image of the imaging device and the gaze direction is identified based on the position of the center of the eyeball and the position of the pupil.

11. The non-transitory computer-readable medium program of claim 7, wherein in the first state, when the position of the pupil of the eye fails to be identified, the gaze direction is identified in accordance with the shape of the eye and the position of the center of the cornea.

12. The non-transitory computer-readable medium of claim 7, wherein in the second state, the direction of the beam emitted from the eye from the image of the imaging device is identified and the gaze direction is identified based on the position of the center of the eyeball and the direction of the beam.

13. A head mount display comprising: a housing mounted on a head of a user; and a gaze detection device mounted on the housing for detecting a gaze direction of the user, wherein the gaze detection device comprises:

a plurality of light sources that illuminate an eye of the user;

an imaging device for imaging an image of the eye; and a processor, wherein the processor:

if bright spots observed on a cornea of the eye based on the plurality of light sources are in a first state, (1-1) identifies a position of a center of the cornea based on the bright spots;

(1-2) identifies a position of a pupil of the eye based on an image of the imaging device; and (1-3) identifies the gaze direction based on the position of the center of the cornea and the position of the pupil, and if the bright spots observed on the cornea of the eye based on the plurality of light sources are in a second state, (2-1) identifies a shape of the eye according to data of a radius of the eye and the position of the center of the eye stored in the storage section; and (2-2) identifies the gaze direction from the image of the imaging device and the position of the center of the eyeball.

14. The gaze detection apparatus according to claim 1, wherein:

the first state corresponds to a state in which a number of bright spots observed on the cornea of the eye based on the plurality of light sources is equal to or greater than a number required to identify the position of the center of the cornea, and the second state corresponds to a state in which the number of the bright spots observed on the cornea of the eye based on the plurality of light sources is less than the number required to identify the position of the center of the cornea.

15. The gaze detection apparatus according to claim 14, wherein:

when the number of the bright spots observed on the cornea of the eye based on the plurality of light sources is equal to or greater than the number required to identify the position of the center of the cornea, the processor further identifies the position of the center of the eyeball and the radius of the eyeball based on the identified gaze direction, and stores the identified position of the center of the eyeball and the radius of the eyeball in the storage unit.

16. The computer-readable medium according to claim 7, wherein:

the first state corresponds to a state in which a number of bright spots observed on the cornea of the eye based on the plurality of light sources is equal to or greater than a number required to identify the position of the center of the cornea, and the second state corresponds to a state in which the number of the bright spots observed on the cornea of the eye based on the plurality of light sources is less than the number required to identify the position of the center of the cornea.

17. The computer-readable medium according to claim 16, wherein:

when the number of the bright spots observed on the cornea of the eye based on the plurality of light sources is equal to or greater than the number required to identify the position of the center of the cornea, the processor further identifies the position of the center of the eyeball and the radius of the eyeball based on the identified gaze direction, and stores the identified position of the center of the eyeball and the radius of the eyeball in the storage unit.

18. The head mount display according to claim 13, wherein:

the first state corresponds to a state in which a number of bright spots observed on the cornea of the eye based on the plurality of light sources is equal to or greater than a number required to identify the position of the center of the cornea, and the second state corresponds to a state in which the number of the bright spots observed on the cornea of the eye based on the plurality of light sources is less than the number required to identify the position of the center of the cornea.

19. The head mount display according to claim 18, wherein:

when the number of the bright spots observed on the cornea of the eye based on the plurality of light sources is equal to or greater than the number required to identify the position of the center of the cornea, the processor further identifies the position of the center of the eyeball and the radius of the eyeball based on the identified gaze direction, and stores the identified position of the center of the eyeball and the radius of the eyeball in the storage unit.

\* \* \* \* \*